(12) United States Patent
Kobayashi et al.

(10) Patent No.: US 12,294,798 B2
(45) Date of Patent: *May 6, 2025

(54) PHOTOELECTRIC CONVERSION DEVICE, PHOTOELECTRIC CONVERSION SYSTEM, AND MOVING BODY

(71) Applicant: CANON KABUSHIKI KAISHA, Tokyo (JP)

(72) Inventors: Hideo Kobayashi, Tokyo (JP); Daisuke Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,432

(22) Filed: Jan. 8, 2024

(65) Prior Publication Data
US 2024/0147096 A1 May 2, 2024

Related U.S. Application Data

(63) Continuation of application No. 17/690,236, filed on Mar. 9, 2022, now Pat. No. 11,910,116.

(30) Foreign Application Priority Data

Mar. 18, 2021 (JP) ................ 2021-045158

(51) Int. Cl.
*H04N 25/75* (2023.01)
*H04N 25/766* (2023.01)
(Continued)

(52) U.S. Cl.
CPC .......... *H04N 25/75* (2023.01); *H04N 25/766* (2023.01); *H04N 25/772* (2023.01); *H04N 25/778* (2023.01)

(58) Field of Classification Search
CPC .... H04N 25/75; H04N 25/766; H04N 25/772; H04N 25/778; H04N 25/00;
(Continued)

(56) References Cited

U.S. PATENT DOCUMENTS

| 7,990,440 B2 | 8/2011 | Kobayashi et al. |
| 8,400,546 B2 | 5/2013 | Itano et al. |

(Continued)

FOREIGN PATENT DOCUMENTS

| JP | 2020-031371 A | 2/2020 |
| WO | 2019/069614 A1 | 4/2019 |

OTHER PUBLICATIONS

U.S. Appl. No. 17/588,484, filed Jan. 31, 2022 (First Named Inventor: Hideo Kobayashi).
(Continued)

*Primary Examiner* — Michael E Teitelbaum
(74) *Attorney, Agent, or Firm* — Venable LLP

(57) ABSTRACT

A photoelectric conversion device includes a pixel array and a reading unit including a plurality of reading circuits each configured to read a signal from the pixel array. Each reading circuit includes a sample-and-hold unit including a first sample-and-hold circuit configured to hold a reset level output from the pixel array and a second sample-and-hold circuit configured to hold a photo signal level output from the pixel array. The plurality of reading circuits include first reading circuits forming a first group and second reading circuits forming a second group. At least some of the plurality of first reading circuits are controlled by a first control signal given via a first control line, and at least some of the plurality of second reading circuits are controlled by a second control signal given via a second control line.

20 Claims, 12 Drawing Sheets

(51) Int. Cl.
*H04N 25/772* (2023.01)
*H04N 25/778* (2023.01)

(58) Field of Classification Search
CPC .... H04N 25/616; H04N 25/618; H04N 25/78; H04N 25/709
See application file for complete search history.

(56) References Cited

U.S. PATENT DOCUMENTS

| | | | |
|---|---|---|---|
| 8,698,062 B2 | 4/2014 | Yoshida |
| 8,710,558 B2 | 4/2014 | Inoue et al. |
| 8,835,828 B2 | 9/2014 | Kobayashi |
| 9,159,750 B2 | 10/2015 | Ikeda et al. |
| 9,264,641 B2 | 2/2016 | Kobayashi |
| 9,350,958 B2 | 5/2016 | Totsuka et al. |
| 9,357,122 B2 | 5/2016 | Kususaki et al. |
| 9,407,839 B2 | 8/2016 | Yoshida |
| 9,407,847 B2 | 8/2016 | Maehashi et al. |
| 9,438,828 B2 | 9/2016 | Itano et al. |
| 9,509,931 B2 | 11/2016 | Kobayashi et al. |
| 9,602,752 B2 | 3/2017 | Kobayashi et al. |
| 9,787,927 B2 | 10/2017 | Yoshida |
| 9,787,932 B2 | 10/2017 | Totsuka et al. |
| 10,003,761 B2 | 6/2018 | Totsuka et al. |
| 10,015,430 B2 | 7/2018 | Kobayashi et al. |
| 10,609,316 B2 | 3/2020 | Kobayashi |
| 2011/0175761 A1 | 7/2011 | Zare-Hoseini |
| 2012/0175503 A1 | 7/2012 | Kuroda et al. |
| 2013/0140440 A1 | 6/2013 | Kobayashi |
| 2013/0288420 A1 | 10/2013 | Lee |
| 2014/0333812 A1 | 11/2014 | Kuroda |
| 2016/0227141 A1 | 8/2016 | Kobayashi et al. |
| 2016/0286144 A1 | 9/2016 | Yanai |
| 2016/0301886 A1 | 10/2016 | Muto et al. |
| 2017/0195596 A1 | 7/2017 | Vogelsang et al. |
| 2021/0021770 A1 | 1/2021 | Nakazawa et al. |
| 2021/0021782 A1 | 1/2021 | Sato et al. |
| 2021/0281784 A1 | 9/2021 | Okada et al. |
| 2021/0391365 A1 | 12/2021 | Kobayashi et al. |
| 2022/0030164 A1 | 1/2022 | Kobayashi |
| 2022/0224855 A1 | 7/2022 | Luypaert |

OTHER PUBLICATIONS

U.S. Appl. No. 17/693,521, filed Mar. 14, 2022 (First Named Inventor: Hideo Kobayashi).
Office Action dated Feb. 7, 2025, in Japanese Patent Application No. 2021-045158.

PHOTOELECTRIC CONVERSION DEVICE, PHOTOELECTRIC CONVERSION SYSTEM, AND MOVING BODY

This is a continuation of U.S. patent application Ser. No. 17/690,236, filed Mar. 9, 2022.

BACKGROUND OF THE INVENTION

Field of the Invention

The present invention relates to a photoelectric conversion device, a photoelectric conversion system, and a moving body.

Description of the Related Art

International Publication No. 2019/069614 describes an image sensor including a pixel array unit, a row selection unit, a load MOS unit, a sample-and-hold unit, an analog-digital conversion unit, a memory unit, a data processor, an output unit, and a timing control unit. The analog-digital conversion unit is, for example, a delta-sigma analog-digital converter (delta-sigma AD converter). The delta-sigma AD converter includes a first integrator, a second integrator, a quantizer, and a decimation filter.

A photoelectric conversion device having an arrangement in which a reading circuit for reading a signal from a pixel array is divided into a plurality of groups and the plurality of groups are controlled by separated control signals is advantageous in increasing the diversity of the operation. This arrangement can provide, for example, a function of causing all the plurality of groups to perform the same operation, a function of pausing the operation of at least one group, and a function of setting the operation of at least one group in a low power consumption state. International Publication No. 2019/069614 neither discloses nor indicates such a viewpoint.

SUMMARY OF THE INVENTION

The present invention provides a technique advantageous in increasing the diversity of the operation of a photoelectric conversion device.

One of aspects of the present invention provides a photoelectric conversion device comprising a pixel array including a plurality of pixels arranged to form a plurality of rows and a plurality of columns, and a reading unit including a plurality of reading circuits each configured to read a signal from the pixel array, wherein each of the plurality of reading circuits includes a sample-and-hold unit, the sample-and-hold unit including a first sample-and-hold circuit configured to hold a reset level output from the pixel array and a second sample-and-hold circuit configured to hold a photo signal level output from the pixel array, the plurality of reading circuits include a plurality of first reading circuits forming a first group and a plurality of second reading circuits forming a second group, and at least some of the plurality of first reading circuits are controlled by a first control signal given via a first control line, and at least some of the plurality of second reading circuits are controlled by a second control signal given via a second control line.

Further features of the present invention will become apparent from the following description of exemplary embodiments with reference to the attached drawings.

DESCRIPTION OF THE EMBODIMENTS

Figure 1:
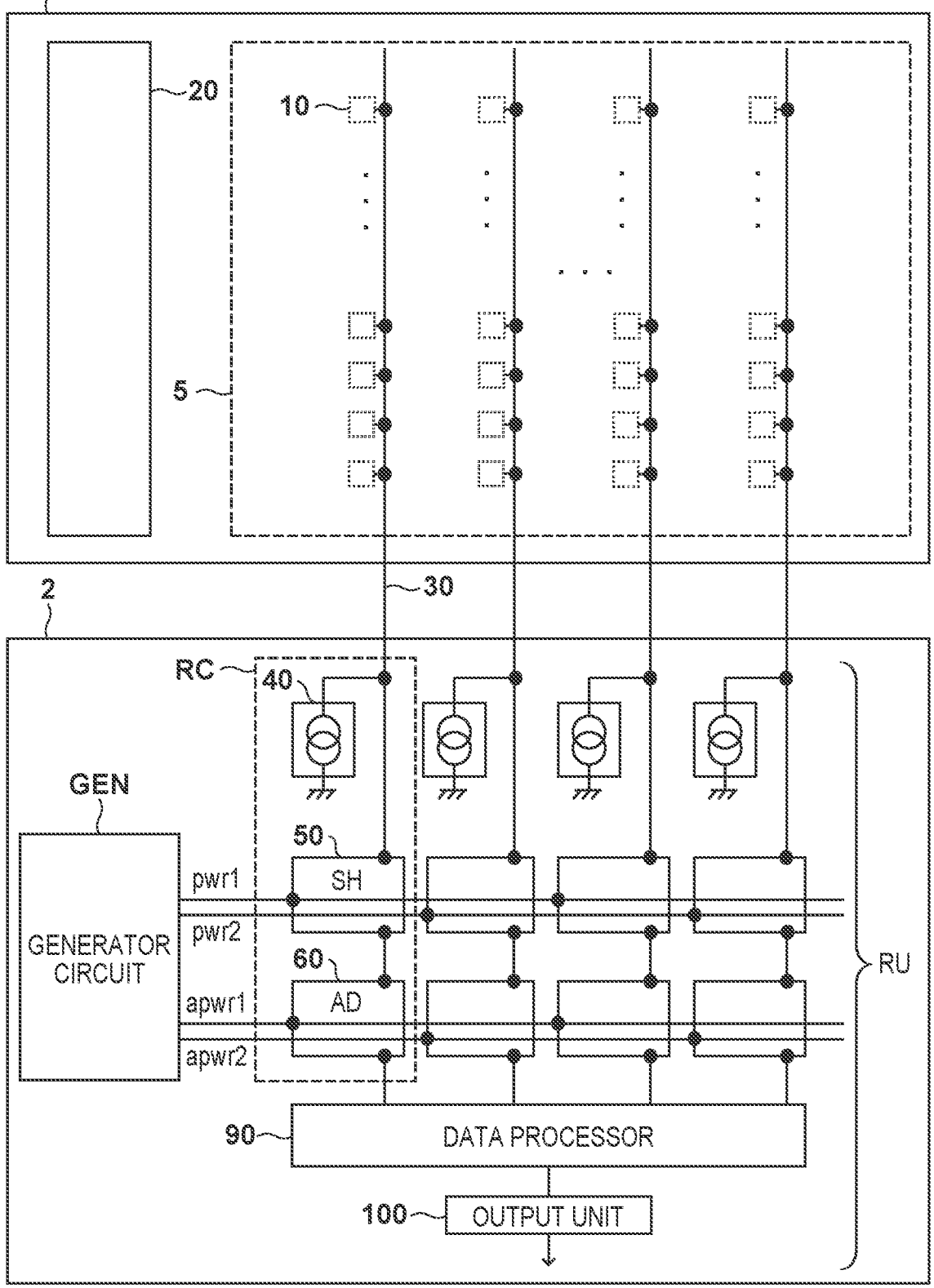
FIG. 1 is a circuit diagram showing the arrangement of a photoelectric conversion device according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 shows the arrangement of a photoelectric conversion device ISD according to the first embodiment. The photoelectric conversion device ISD can be formed as an image sensor or an image capturing device. From another viewpoint, the photoelectric conversion device ISD can be configured to capture an image and output, to an external device, for example, a storage device, a processing device, a display device, or a communication device, the captured image or information or an image obtained by processing the captured image.

The photoelectric conversion device ISD can include, for example, a pixel array 5 and a reading unit RU. The pixel array 5 includes a plurality of pixels 10 arranged to form a plurality of rows and a plurality of columns. A direction along the row can be called a row direction, and a direction along the column can be called a column direction. For the sake of convenience, the row direction can be called a horizontal direction or the first direction, and the column direction can be called a vertical direction or the second direction. A plurality of vertical signal lines 30 are arranged in the pixel array 5. For each of the plurality of columns formed by the plurality of pixels 10 in the pixel array 5, at least one vertical signal line 30 can be assigned. The reading unit RU includes a plurality of reading circuits RC each for reading a signal from the pixel array 5. Each reading circuit RC can be connected to one vertical signal line 30. The photoelectric conversion device ISD further includes a row selection circuit 20 for selecting a row of the pixel array 5.

The reading circuit RC can include, for example, a current source 40, a sample-and-hold unit 50, and an AD (analog-digital) converter 60. The current source 40 is connected to the vertical signal line 30 to supply a constant current to the vertical signal line 30. The sample-and-hold unit 50 samples and holds signals output from the selected pixel 10 of the pixel array 5 via the vertical signal line 30. The signal can include a reset level output from the selected pixel 10 of the pixel array 5 via the vertical signal line 30, and a photo signal level output from the selected pixel 10 of the pixel array 5 via the vertical signal line 30. As exemplified in FIG. 3, each reading circuit RC can include a first sample-and-hold circuit 210 and a second sample-and-hold circuit 211 for respectively holding the reset level and the photo signal level output from the pixel array 5 via the vertical signal line 30. The AD converter 60 AD-converts the signal output from the sample-and-hold unit 50. The AD converter 60 can be, for example, a slope AD converter, a successive approximation type AD converter, or a delta-sigma AD converter but is not limited to them.

In addition, the reading unit RU can include a processor 90 that processes an image or data output from the plurality of reading circuits RC, and an output unit 100 that outputs an image or data obtained by processing the data by the processor 90. The data processor 90 may generate an image by processing the image or data output from the plurality of reading circuits RC, or generate target data by further processing the image. The processing by the data processor 90 can include, for example, processing of correcting the image or data output from the plurality of reading circuits RC and interpolation processing for the image or data output from the plurality of reading circuits RC.

In one example, the pixel array 5 may be arranged on a first substrate 1, and the reading unit RU may be arranged on a second substrate 2. The row selection circuit 20 may be arranged on the first substrate 1 or the second substrate 2. However, the pixel array 5 and the reading unit RU may be arranged on one substrate. Furthermore, the plurality of elements forming the reading unit RU may be divided and arranged on a plurality of substrates.

The plurality of reading circuits RC can include a plurality of first reading circuits forming the first group and a plurality of second reading circuits forming the second group. In the example shown in FIG. 1, the reading circuits RC arranged in odd-numbered columns are the first reading circuits, and the reading circuits RC arranged in even-numbered columns are the second reading circuits. This is merely an example. The plurality of first reading circuits are controlled by the first control signals given via first control lines pwr1 and apwr1, and the plurality of second reading circuits are controlled by the second control signals given via second control lines pwr2 and apwr2. Note that in this specification, for the sake of descriptive simplicity, a name for identifying a signal line is also used as a name for identifying a signal output to the signal line. For example, the first control signal pwr1 is given to the first reading circuit via the first control line pwr1.

The photoelectric conversion device ISD can include a generator circuit GEN that generates the first control signals pwr1 and apwr1 and the second control signals pwr2 and apwr2. Alternatively, the photoelectric conversion device ISD may include the first and second pads that receive the first control signals pwr1 and apwr1 and the second control signals pwr2 and apwr2 from the outside, respectively. The first and second pads can be connected respectively to the first and second pins of a package that seals one or a plurality of substrates forming the photoelectric conversion device ISD. The photoelectric conversion device ISD can have a plurality of operation modes, and the plurality of operation modes can include modes in which the active periods of the first control signals pwr1 and apwr1 and those of the second control signals pwr2 and apwr2 are different.

Table 1 exemplifies the logic levels of the first control signals pwr1 and apwr1 and the second control signals pwr2 and apwr2 in the first, second, and third modes. The first control signals pwr1 and apwr1 can be signals for setting the plurality of first reading circuits in one of a plurality of states including the first and second states. The second control signals pwr2 and apwr2 can be signals for setting the plurality of second reading circuits in one of the plurality of states. The second state can be a state in which the power consumption is lower than that in the first state.

TABLE 1

| Mode | pwr1 | pwr2 | apwr1 | apwr2 |
| --- | --- | --- | --- | --- |
| first mode | H | H | H | H |
| second mode | H | L | H | L |
| third mode | L | H | L | H |

Figure 2:
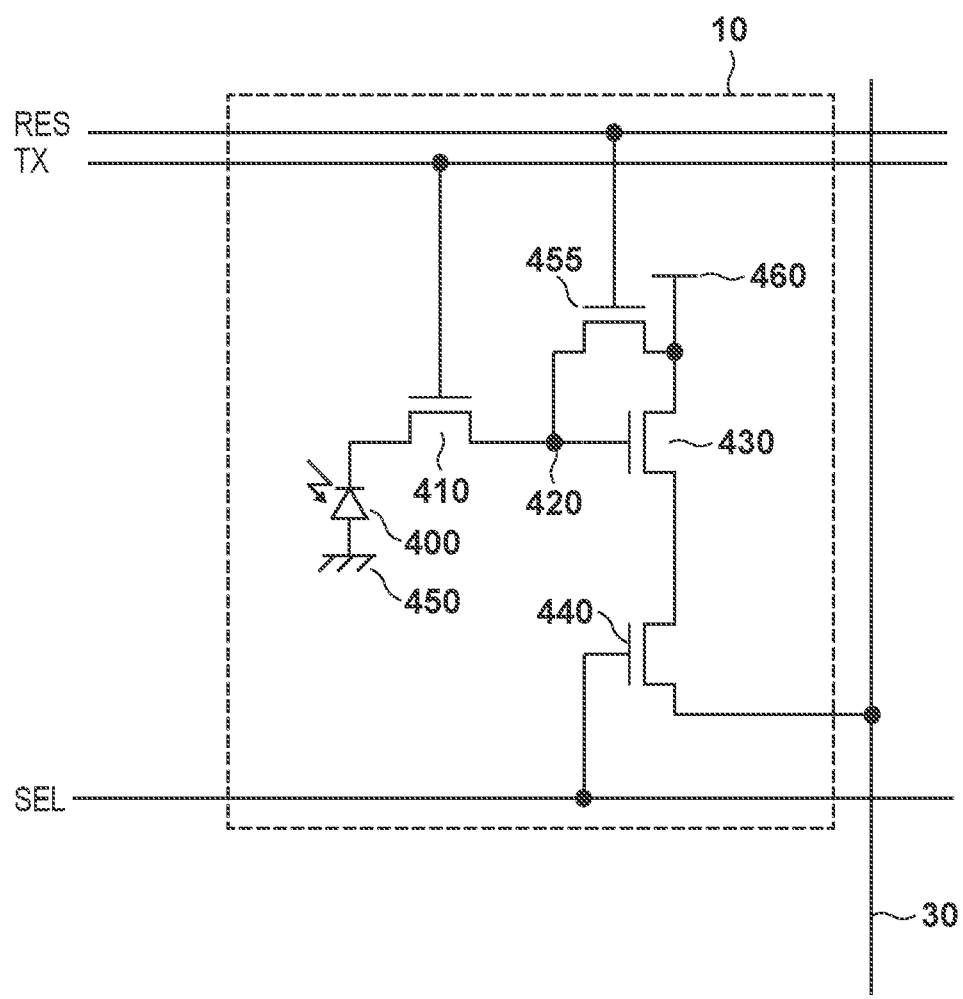
FIG. 2 is a circuit diagram showing an example of the arrangement of a pixel.

FIG. 2 shows an example of the arrangement of the pixel 10. The pixel 10 includes, for example, a photoelectric converter 400, a transfer transistor 410, a reset transistor 455, an amplification transistor 430, and a selection transistor 440. The photoelectric converter 400 can be, for example, a photodiode. The photoelectric converter 400 includes main electrodes, one of which is connected to a ground potential 450, and can photoelectrically convert received light into signal charges (for example, photoelectrons) of a charge amount corresponding to the light amount of the received light to accumulate them. The other of the main electrodes of the photoelectric converter 400 can be electrically connected to the gate electrode of the amplification transistor 430 via the transfer transistor 410. A node 420 including the gate electrode of the amplification transistor 430 can function as a floating diffusion. The floating diffusion serves as a charge-to-voltage converter that converts, into a signal voltage, the signal charges generated by the photoelectric converter 400.

A transfer signal TX is supplied from the row selection circuit 20 to the gate electrode of the transfer transistor 410.

When the transfer transistor 410 is set in a conductive state in accordance with the transfer signal TX, the signal charges photoelectrically converted and accumulated in the photoelectric converter 400 are transferred to the node 420 as the floating diffusion.

The reset transistor 455 can be connected between a power supply potential 460 and the node 420. When it is expressed that the transistor is connected between A and B, this indicates that one of the two main electrodes of the transistor is electrically connected to A and the other of the two main electrodes is electrically connected to B. Furthermore, in the above expression, the gate electrode of the transistor is connected to neither A nor B. A reset signal RES is supplied from the row selection circuit 20 to the gate electrode of the reset transistor 455. When the reset transistor 455 is set in the conductive state in accordance with the reset signal RES, the potential of the node 420 (floating diffusion) is reset to a potential corresponding to the power supply potential 460, and the charges of the floating diffusion are swept out.

The amplification transistor 430 includes the gate electrode connected to the node 420, and two main electrodes, one of which can be connected to the power supply potential 460 and the other of which can be connected to the selection transistor 440. The amplification transistor 430 can form the input unit of a source follower that reads a signal obtained by photoelectric conversion of the photoelectric converter 400. That is, the other of the two main electrodes of the amplification transistor 430 is electrically connected to the vertical signal line 30 via the selection transistor 440. The amplification transistor 430 and the current source 40 connected to the vertical signal line 30 form the source follower that outputs, to the vertical signal line 30, a potential corresponding to the voltage of the node 420.

The selection transistor 440 can be connected between the amplification transistor 430 and the vertical signal line 30. A selection signal SEL is supplied from the row selection circuit 20 to the gate electrode of the selection transistor 440. When the selection transistor 440 is set in the conductive state in accordance with the selection signal SEL, the pixel 10 is set in a selected state, and a signal output from the amplification transistor 430 is transmitted to the vertical signal line 30.

The circuit arrangement of the pixel 10 is not limited to that shown in FIG. 2. For example, the selection transistor 440 may be connected between the power supply potential 460 and the amplification transistor 430. Furthermore, in the arrangement shown in FIG. 2, the pixel 10 has the arrangement including the transfer transistor 410, the reset transistor 455, the amplification transistor 430, and the selection transistor 440. The arrangement of the pixel 10 is not limited to this. For example, the selection transistor 440 may be eliminated and the amplification transistor 430 may function as a selection transistor. In accordance with the specification required for the photoelectric conversion device ISD and the like, the number of transistors may be increased. The reset level when the reset transistor 455 resets the potential of the node 420 and the photo signal level when the charges are transferred from the photoelectric converter 400 to the node 420 can be time-divisionally output from the pixel 10.

Figure 3:
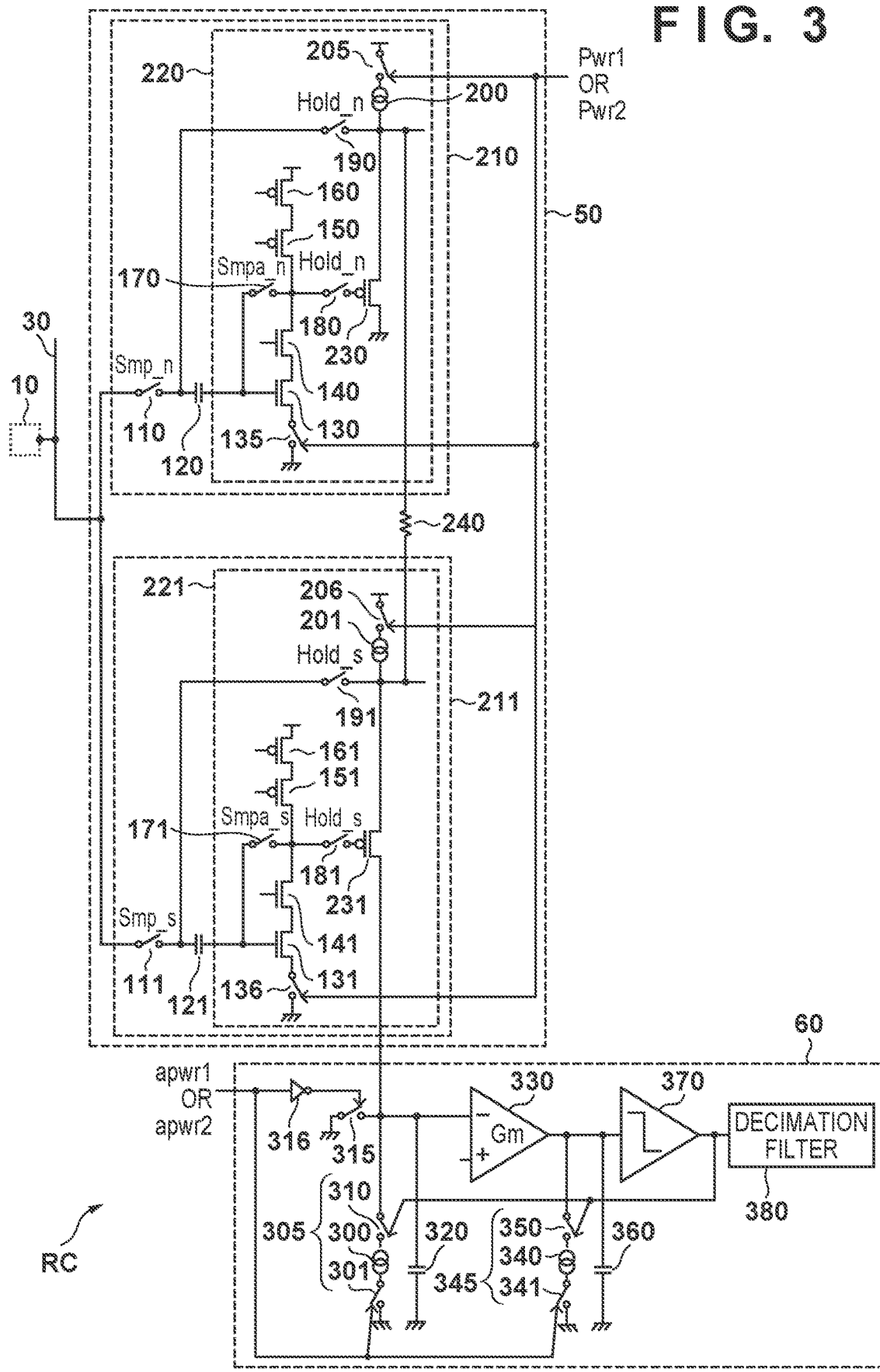
FIG. 3 is a circuit diagram showing an example of the arrangement of a sample-and-hold unit and an AD converter according to the first embodiment.

FIG. 3 shows an example of the arrangement of the sample-and-hold unit 50 and the AD converter 60 according to the first embodiment. In the example of the arrangement shown in FIG. 3, each reading circuit RC includes the first sample-and-hold circuit 210 and the second sample-and-hold circuit 211. The first sample-and-hold circuit 210 samples and holds the reset level output from the pixel array 5 via the vertical signal line 30. The second sample-and-hold circuit 211 samples and holds the photo signal level output from the pixel array 5 via the vertical signal line 30.

The first sample-and-hold circuit 210 can include, for example, a switch 110, a first capacitive element 120, and a first inverting amplifier (first amplifier) 220. The switch 110 can control connection between the vertical signal line 30 and the first capacitive element 120 in accordance with a control signal Smp_n generated by a control circuit (not shown) of the photoelectric conversion device ISD. The inverting amplifier 220 can be formed by, for example, a combination of a source ground circuit and a source follower circuit. The inverting amplifier 220 can include, for example, transistors 130, 140, 150, 160, and 230, switches 170, 180, and 190, and a current source 200. The switch 170 is connected, for example, between the input and output of the source ground circuit, and can be controlled by a control signal Smpa_n generated by the control circuit (not shown). In accordance with a control signal Hold_n generated by the control circuit (not shown), the inverting amplifier 220 can output a signal whose reset level has been inverted and amplified.

The second sample-and-hold circuit 211 can have the same arrangement as that of the sample-and-hold circuit 210. More specifically, the second sample-and-hold circuit 211 can include, for example, a switch 111, a second capacitive element 121, and a second inverting amplifier (second amplifier) 221. The switch 111 can control connection between the vertical signal line 30 and the second capacitive element 121 in accordance with a control signal Smp_s generated by the control circuit (not shown). The inverting amplifier 221 can be formed by a combination of a source ground circuit and a source follower circuit. The inverting amplifier 221 can include, for example, transistors 131, 141, 151, 161, and 231, switches 171, 181, and 191, and a current source 201. The switch 171 is connected, for example, between the input and output of the source ground circuit, and can be controlled by a control signal Smpa_s generated by the control circuit (not shown). In accordance with a control signal Holds generated by the control circuit (not shown), the inverting amplifier 221 can output a signal whose photo signal level has been inverted and amplified.

The output terminal of the sample-and-hold circuit 210 that samples and holds the reset level and the output terminal of the sample-and-hold circuit 211 that samples and holds the photo signal level can be connected by a resistive element 240. A current I flowing through the resistive element 240 is given by:

$$I = (Vn - Vs)/R$$

where Vn represents the potential of the output terminal of the sample-and-hold circuit 210, that is, a potential corresponding to the reset level, Vs represents the potential of the output terminal of the sample-and-hold circuit 211, that is, a potential corresponding to the photo signal level, and R represents the resistance value of the resistive element 240. The current I is supplied to the AD converter 60. The current I flowing through the resistive element 240 is proportional to the difference between the potential Vn of the reset signal corresponding to the reset level and the potential Vs corresponding to the photo signal level. Therefore, when the current I is input to the AD converter 60, CDS (Correlated Double Sampling) has been performed.

In the example of the arrangement shown in FIG. 3, the AD converter 60 is formed by a delta-sigma AD converter. A delta-sigma analog-digital conversion circuit 390 can include, for example, a first integrator, a second integrator, a quantizer 370, and a decimation filter 380. The first integrator can be formed by an integral capacitance 320. The second integrator can be formed by an integral capacitance 360 and a Gm cell 330 that converts a voltage into a current. The output of a DA (digital-analog) converter 305 including a current source 300 and a switch 310 can be connected to the input node of the first integrator. The DA converter 305 subtracts, from the current I, a current corresponding to an output from the quantizer 370. The output of a DA converter 345 including a current source 340 and a switch 350 can be connected to the input node of the second integrator. The DA converter 345 subtracts, from the output current of the Gm cell 330, a current corresponding to the output from the quantizer 370.

The AD converter 60 formed as a delta-sigma AD converter performs an operation of feeding back the output from the quantizer 370 to the first and second integrators via the DA converters 305 and 345, respectively. By passing the output from the quantizer 370 through the first and second integrators while feeding it back by the DA converters 305 and 345, it is possible to obtain a secondary noise shaping characteristic. Furthermore, by removing high-frequency noise by the decimation filter 380 arranged at the succeeding stage of the quantizer 370, it is possible to obtain an accurate analog-digital conversion output.

Figure 4:
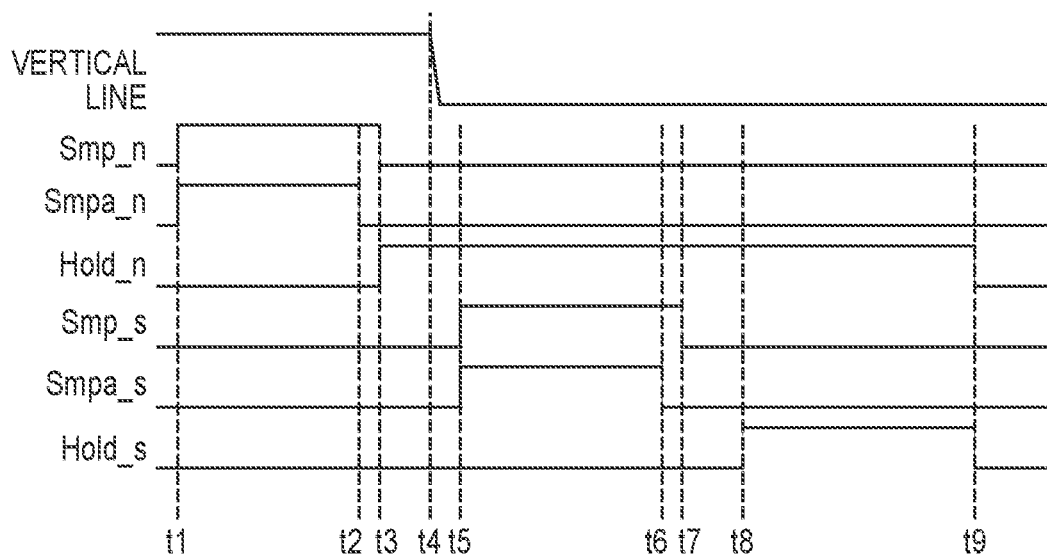
FIG. 4 is a timing chart showing an example of driving of sample-and-hold circuits according to the first embodiment.

FIG. 4 shows an example of driving of the sample-and-hold circuits 210 and 211. FIG. 4 shows the waveforms of the potential of the vertical signal line 30 and the control signals Smp_n, Smpa_n, Hold_n, Smp_s, Smpa_s, and Holds of the switches of the sample-and-hold circuits 210 and 211. In the waveforms shown in FIG. 4, while each control signal is at high level, the switch to which the control signal is input is set in the ON state (conductive state), and while each control signal is at low level, the switch to which the control signal is input is set in the OFF state (nonconductive state).

First, at time t1, the control signals Smp_n and Smpa_n are set at high level, and thus the switches 110 and 170 are set in the ON state in the sample-and-hold circuit 210 for sampling and holding the reset level. Next, at time t2 when the control signal Smpa_n transitions from high level to low level, the potential Vn corresponding to the reset level is sampled and accumulated in the capacitive element 120.

Next, at time t3, the control signal Smp_n transitions from high level to low level, the control signal Hold_n is set at high level, and the switches 180 and 190 are set in the ON state. This causes the capacitive element 120 of the sample-and-hold circuit 210 to hold the potential Vn corresponding to the reset level. A potential corresponding to the potential Vn sampled and held by the capacitive element 120 is output from the sample-and-hold circuit 210.

At time t4, the photo signal level from the pixel 10 starts to be output to the vertical signal line 30. Next, at time t5, the control signals Smp_s and Smpa_s are set at high level, and thus the switches 110 and 170 are set in the ON state in the sample-and-hold circuit 211 for sampling and holding the photo signal level. At time t6 when the control signal Smpa_s transitions from high level to low level, the potential Vs corresponding to the photo signal level is sampled and accumulated in the capacitive element 120.

Next, at time t7, the control signal Smp_s transitions from high level to low level. At time t8, the control signal Hold_n is set at high level, and thus the switches 181 and 191 are set in the ON state. This causes the capacitive element 121 of the sample-and-hold circuit 211 to hold the potential Vs corresponding to the photo signal level. The potential Vs sampled and held by the capacitive element 121 is output from the sample-and-hold circuit 210. As described above, a current corresponding to the difference between the potential Vn of the output terminal of the sample-and-hold circuit 210 and the potential Vs of the data signal of the output terminal of the sample-and-hold circuit 211 is input to the AD converter 60. Next, at time t9, the control signals Hold_n and Holds are set at low level.

In the sample-and-hold unit 50 of each reading circuit RC, a switch for blocking a path between a power supply line and a ground line can be provided. More specifically, switches 135 and 205 for blocking the path between the power supply line and the ground line can be provided in the sample-and-hold circuit 210, and switches 136 and 206 for blocking the path between the power supply line and the ground line can be provided in the sample-and-hold circuit 211. Furthermore, in the AD converter 60 of each reading circuit RC, a switch for blocking the path between the power supply line and the ground line can be provided. More specifically, switches 301 and 341 for blocking the path between the power supply line and the ground line can be provided in the AD converter 60.

The first control signal pwr1 can be supplied to the switches 135 and 205 of the sample-and-hold circuit 210 of each of the plurality of first reading circuits forming the first group. The first control signal apwr1 can be supplied to the switches 301 and 341 of the AD converter 60 of each of the plurality of first reading circuits forming the first group. The second control signal pwr2 can be supplied to the switches 135 and 205 of the sample-and-hold circuit 210 of each of the plurality of second reading circuits forming the second group. The second control signal apwr2 can be supplied to the switches 301 and 341 of the AD converter 60 of each of the plurality of second reading circuits forming the second group.

In the first mode shown in Table 1, when the first control signals pwr1 and apwr1 are at high level, the second control signals pwr2 and apwr2 are driven to high level, and thus both the first and second groups are set in the first state (normal operation state).

In the second mode shown in Table 1, when the first control signals pwr1 and apwr1 are at high level, the second control signals pwr2 and apwr2 are driven to low level, and thus the first group is set in the first state (normal operation state) and the second group is set in the second state (power saving state). In the example shown in FIG. 1, in the second mode, the reading circuits RC of the first group, that is, the reading circuits RC of the odd-numbered columns as the first reading circuits are set in the first state (normal operation state), and the reading circuits RC of the second group, that is, the reading circuits RC of the even-numbered columns as the second reading circuits are set in the second state (power saving state).

In the third mode shown in Table 1, when the first control signals pwr1 and apwr1 are at low level, the second control signals pwr2 and apwr2 are driven to high level, and thus the first group is set in the second state (power saving state) and the second group is set in the first state (normal operation state). In the example shown in FIG. 1, in the third mode, the reading circuits RC of the first group, that is, the reading circuits RC of the odd-numbered columns as the first reading circuits are set in the second state (power saving state), and the reading circuits RC of the second group, that is, the reading circuits RC of the even-numbered columns as the second reading circuits are set in the first state (normal operation state).

The quantizer 370 may be configured to fix the output of the quantizer 370 at low level, and in the second state (power saving state), the output of the quantizer 370 may be fixed at low level, thereby turning off the switches 310 and 350. In this case, the switches 301 and 341 are unnecessary, and the output of the quantizer 370 may be controlled by the control signal apwr1 or apwr2.

The reading circuit RC can include a potential fixing device 315 that fixes the potential of the input node of the AD converter 60 (Gm cell 330) in accordance with the control signal apwr1 or apwr2 when turning off the switches 205, 206, and 301 (or switch 310). From another viewpoint, the reading circuit RC can include the potential fixing device 315 that fixes the potential of the input node of the AD converter 60 (Gm cell 330) in accordance with the control signal apwr1 or apwr2 when turning off the current sources 200, 201, and 300. If there is no potential fixing device 315, the input node of the AD converter 60 (Gm cell 330) can be set in the floating state when turning off the current sources 200, 201, and 300. In this case, the potential variation of the power supply line and that of the ground line cause an erroneous operation of the AD converter 60 (for example, the Gm cell 330), thereby consuming power. The potential fixing device 315 is effective to solve this problem.

Figure 5:
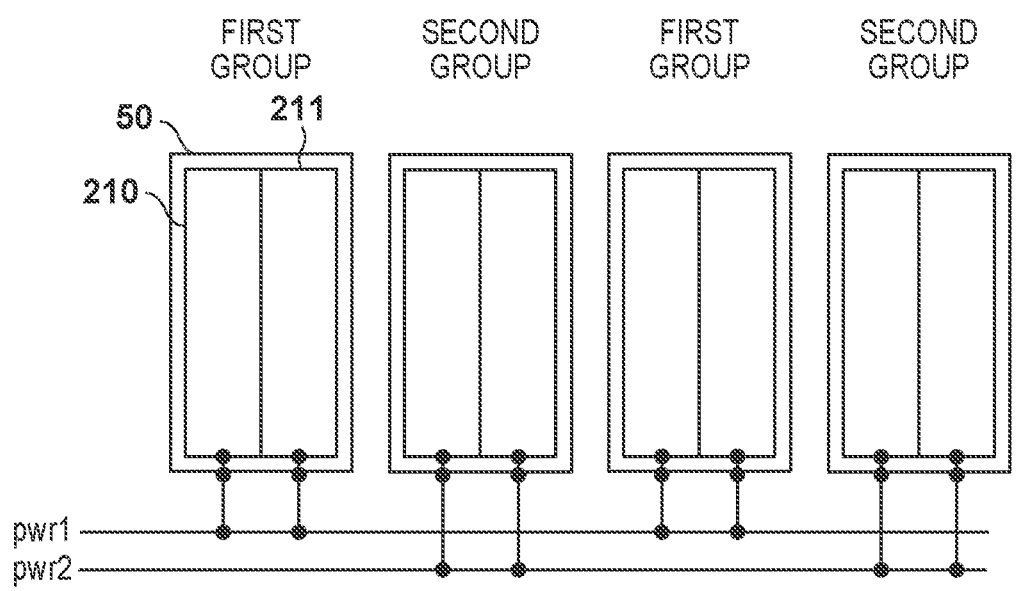
FIG. 5 is a view schematically showing an example of the physical arrangement of the first and second control lines and the sample-and-hold units.

FIG. 5 schematically shows an example of the physical arrangement of the first control line pwr1, the second control line pwr2, and the sample-and-hold units 50. One of the first control line pwr1 and the second control line pwr2 is connected to both the sample-and-hold circuits 210 and 211 of one sample-and-hold unit 50. According to the example shown in FIG. 1, the first control line pwr1 is connected to the sample-and-hold circuits 210 and 211 of the sample-and-hold units 50 of the odd-numbered columns (first group). On the other hand, the second control line pwr2 is connected to the sample-and-hold circuits 210 and 211 of the sample-and-hold units 50 of the even-numbered columns (second group). Furthermore, the plurality of sample-and-hold units 50 of the first group share the first control line pwr1, and the plurality of sample-and-hold units 50 of the second group share the second control line pwr2. This arrangement is advantageous in simplifying the wiring of the first control line pwr1 and the second control line pwr2.

Figure 6:
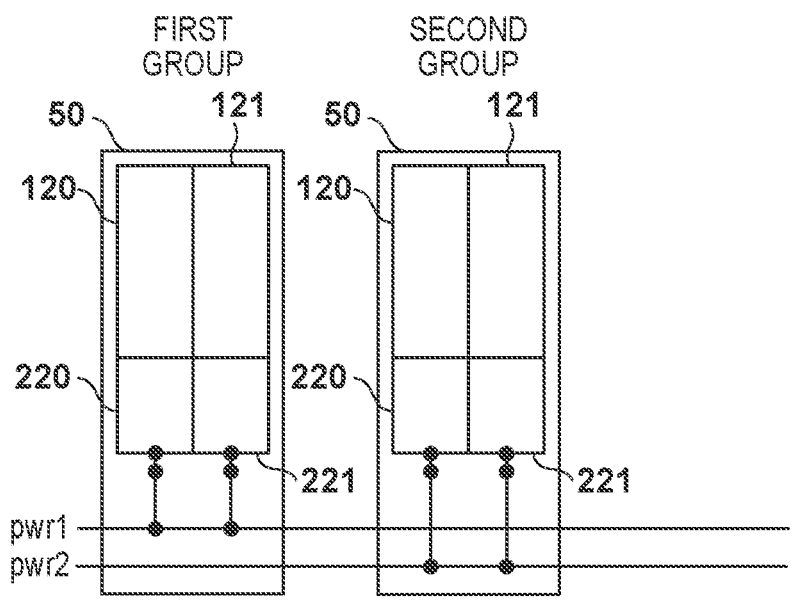
FIG. 6 is a view schematically showing an example of the physical arrangement of a first capacitive element and a first inverting amplifier of a first sample-and-hold circuit and a second capacitive element and a second inverting amplifier of a second sample-and-hold circuit.

FIG. 6 schematically shows an example of the physical arrangement of the first capacitive element 120 and the first inverting amplifier 220 of the first sample-and-hold circuit 210 and the second capacitive element 121 and the second inverting amplifier 221 of the second sample-and-hold circuit 211. As exemplified in FIG. 6, the first capacitive element 120 and the second capacitive element 121 can be arranged to be adjacent to each other in the row direction. The first inverting amplifier 220 and the second inverting amplifier 221 can be arranged to be adjacent to each other in the row direction.

Figure 7:
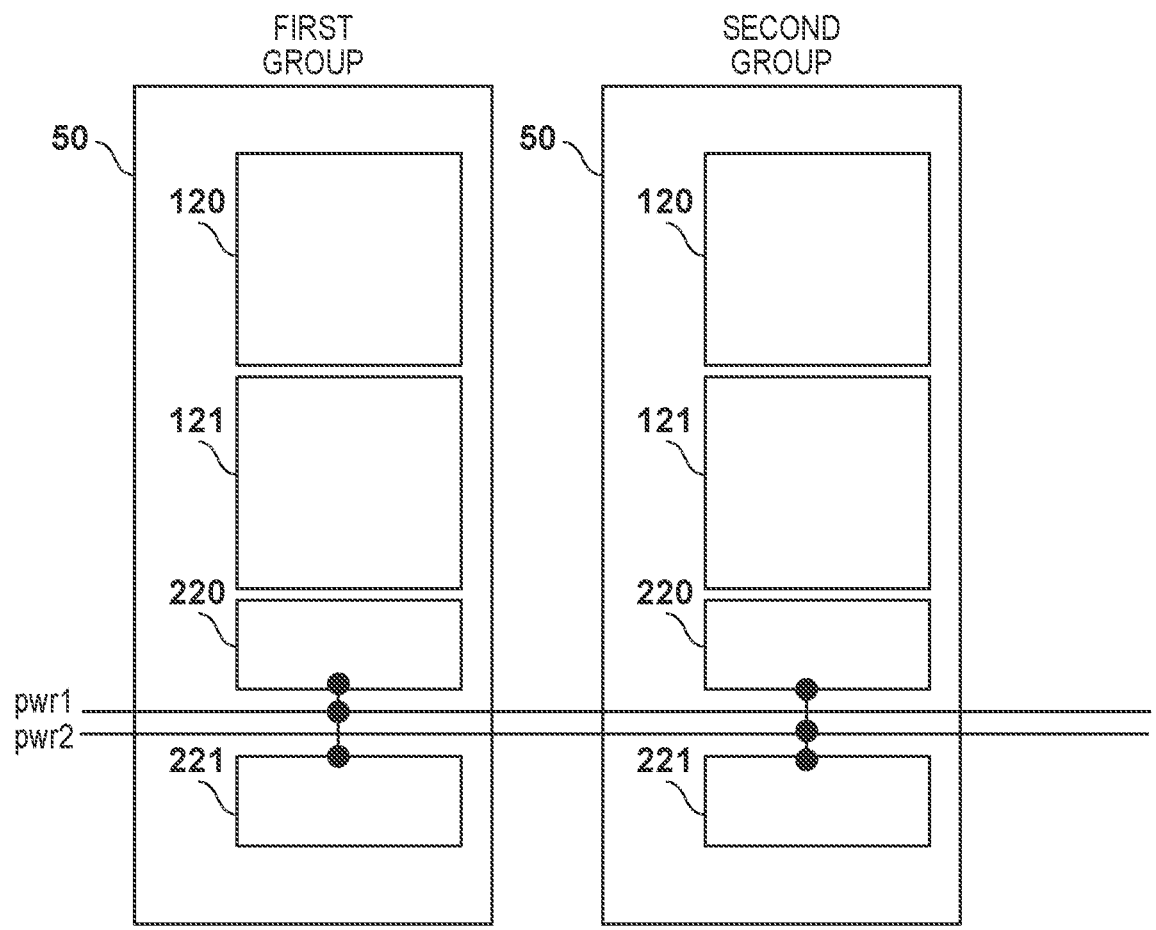
FIG. 7 is a view schematically showing another example of the physical arrangement of the first capacitive element and the first inverting amplifier of the first sample-and-hold circuit and the second capacitive element and the second inverting amplifier of the second sample-and-hold circuit.

FIG. 7 schematically shows another example of the physical arrangement of the first capacitive element 120 and the first inverting amplifier 220 of the first sample-and-hold circuit 210 and the second capacitive element 121 and the second inverting amplifier 221 of the second sample-and-hold circuit 211. As exemplified in FIG. 7, the first capacitive element 120 and the second capacitive element 121 can be arranged to be adjacent to each other in the column direction. The first inverting amplifier 220 and the second inverting amplifier 221 can be arranged to be adjacent to each other in the column direction.

As exemplified in FIGS. 6 and 7, the arrangement in which the first capacitive element 120 and the second capacitive element 121 are arranged to be adjacent to each other is advantageous in reducing variations of the capacitance value between the first capacitive element 120 and the second capacitive element 121. The arrangement in which the first inverting amplifier 220 and the second inverting amplifier 221 are arranged to be adjacent to each other is advantageous in reducing variations of characteristics between the first inverting amplifier 220 and the second inverting amplifier 221. Reducing variations of the capacitance value and reducing variations of the characteristics of the inverting amplifier (amplifier) are advantageous in improving the CDS performance. Furthermore, such arrangement is advantageous in reducing the wiring area of the control lines pwr1 and pwr2.

Figure 8:
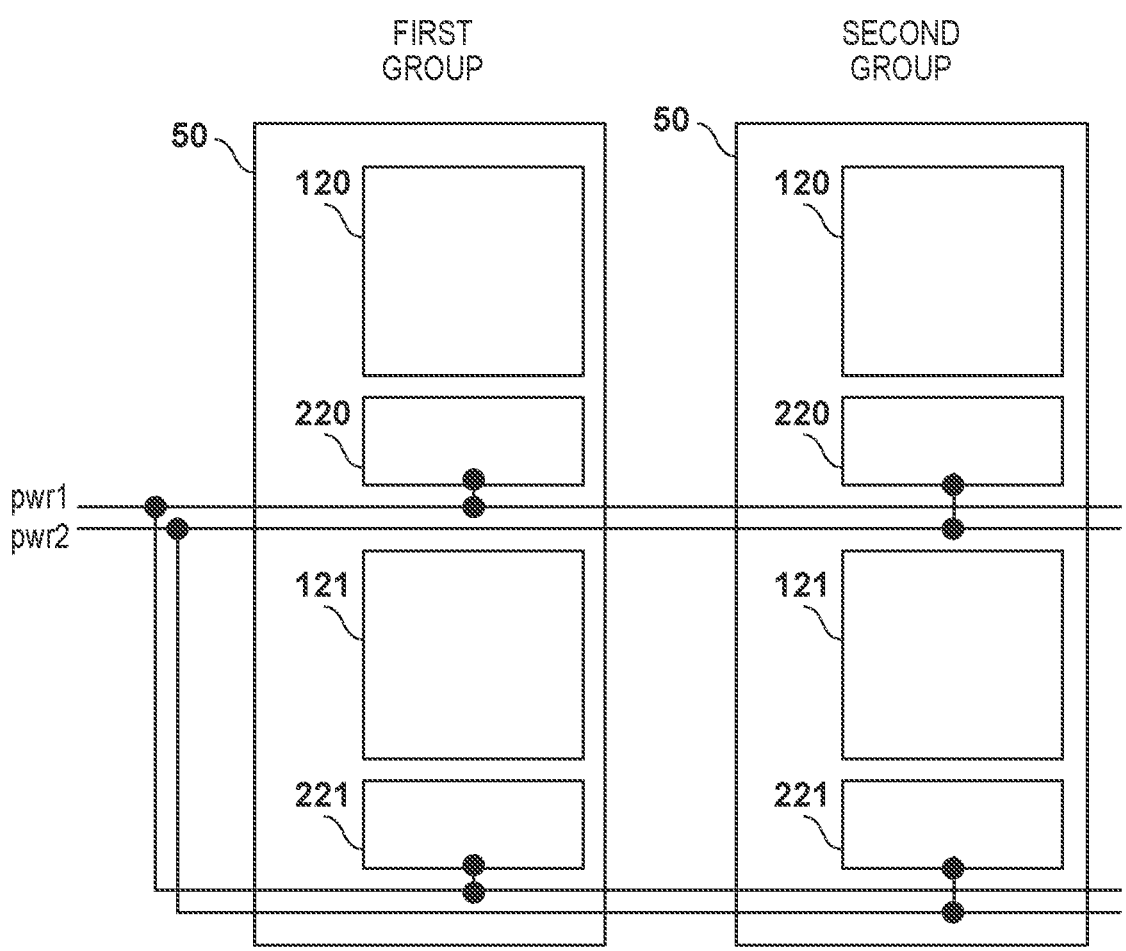
FIG. 8 is a view schematically showing still another example of the physical arrangement of the first capacitive element and the first inverting amplifier of the first sample-and-hold circuit and the second capacitive element and the second inverting amplifier of the second sample-and-hold circuit.

FIG. 8 schematically shows still another example of the physical arrangement of the first capacitive element 120 and the first inverting amplifier 220 of the first sample-and-hold circuit 210 and the second capacitive element 121 and the second inverting amplifier 221 of the second sample-and-hold circuit 211. The example of the arrangement shown in FIG. 8 is inferior to the example of the arrangement shown in FIG. 6 or 7 in terms of reducing variations of the capacitance value, reducing variations of the characteristics of the inverting amplifier (amplifier), and reducing the wiring area of the control lines. However, the present invention does not exclude such arrangement.

Figure 9:
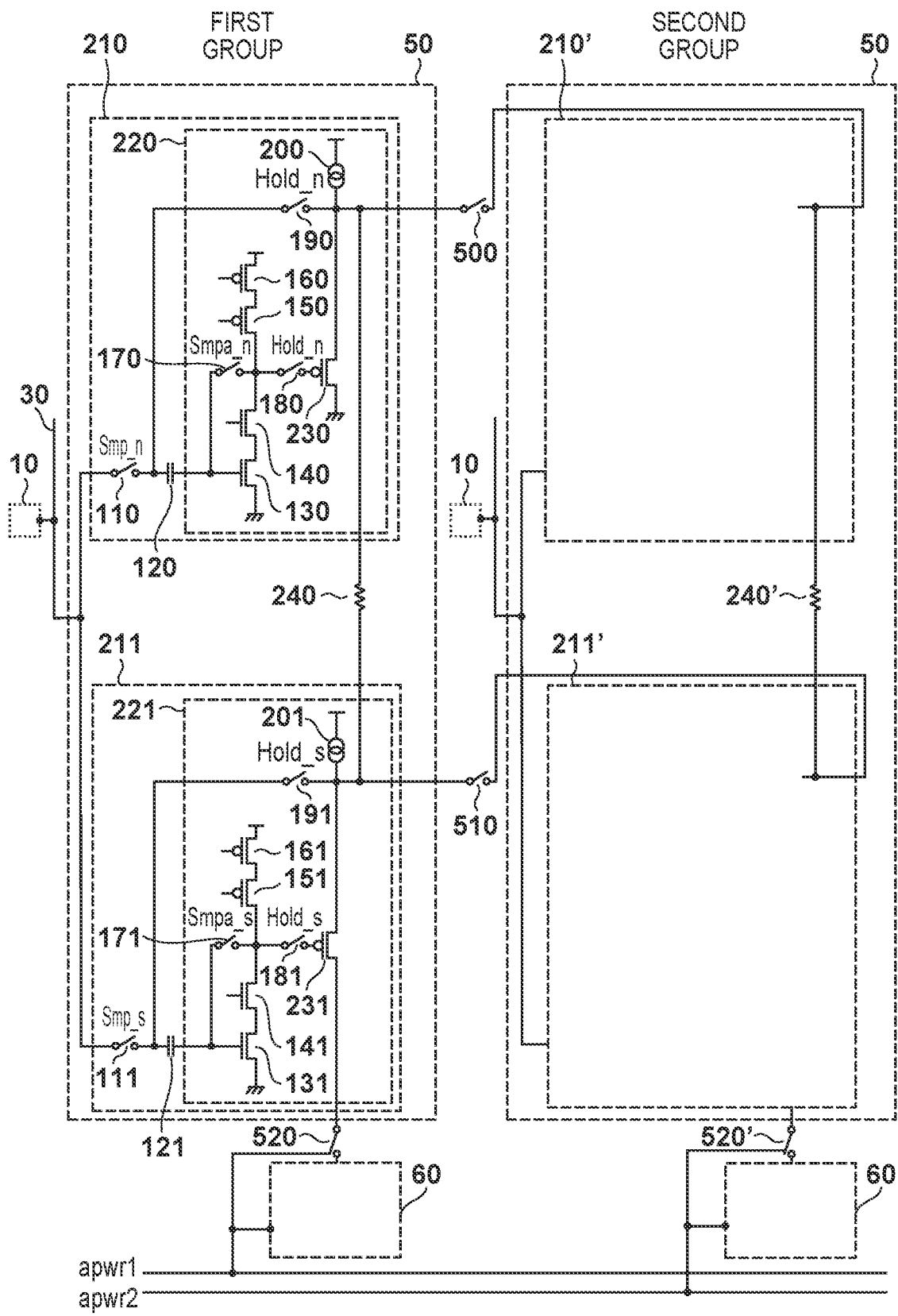
FIG. 9 is a circuit diagram showing an example of the arrangement of sample-and-hold units and AD converters in a photoelectric conversion device according to the second embodiment.

FIG. 9 shows an example of the arrangement of sample-and-hold units 50 and AD converters 60 in a photoelectric conversion device ISD according to the second embodiment. Matters not mentioned in the second embodiment can comply with the first embodiment. In the second embodiment, a reading unit RU is configured to generate a signal corresponding to a signal of a pixel assigned with the first reading circuit and a signal of a pixel assigned with the second reading circuit. In the second or third mode, the reading unit RU can generate a signal corresponding to the signal of the pixel assigned with the first reading circuit and the signal of the pixel assigned with the second reading unit. In this example, to discriminate the sample-and-hold unit 50 and the AD converter 60 forming the first reading circuit and those forming the second reading circuit, reference numerals denoting the sample-and-hold unit and the AD converter forming the second reading circuit are added with "'".

The reading unit RU can include, for example, a first switch 500 and a second switch 510. One first switch 500 and one second switch 510 are provided for one first reading circuit and one second reading circuit. From another viewpoint, one first switch 500 and one second switch 510 are provided for one first reading circuit and one second reading circuit which are adjacent to each other. The first switch 500 can be arranged so as to electrically connect the output of a first sample-and-hold circuit 210 of a first reading circuit RC of the first group and the output of a first sample-and-hold circuit 210' of a second reading circuit RC' of the second group. The second switch 510 can be arranged so as to electrically connect the output of a second sample-and-hold circuit 211 of the first reading circuit RC of the first group and the output of a second sample-and-hold circuit 211' of the second reading circuit RC' of the second group. The first switch 500 and the second switch 510 can be controlled to be turned on in the second and third modes.

By turning on the first switch 500, a potential Vn of the output terminal of the first sample-and-hold circuit 210 of the first reading circuit RC of the first group and a potential Vn' of the output terminal of the first sample-and-hold circuit 210' of the second reading circuit RC' of the second group can be averaged. By turning on the second switch 510, a potential Vs of the output terminal of the second sample-and-hold circuit 211 of the first reading circuit RC of the first group and a potential Vs' of the output terminal of the second sample-and-hold circuit 211' of the second reading circuit RC' of the second group can be averaged.

According to the second embodiment, in the second or third mode, it is possible to reduce noise by averaging the signals of two pixels while saving power.

Figure 10:
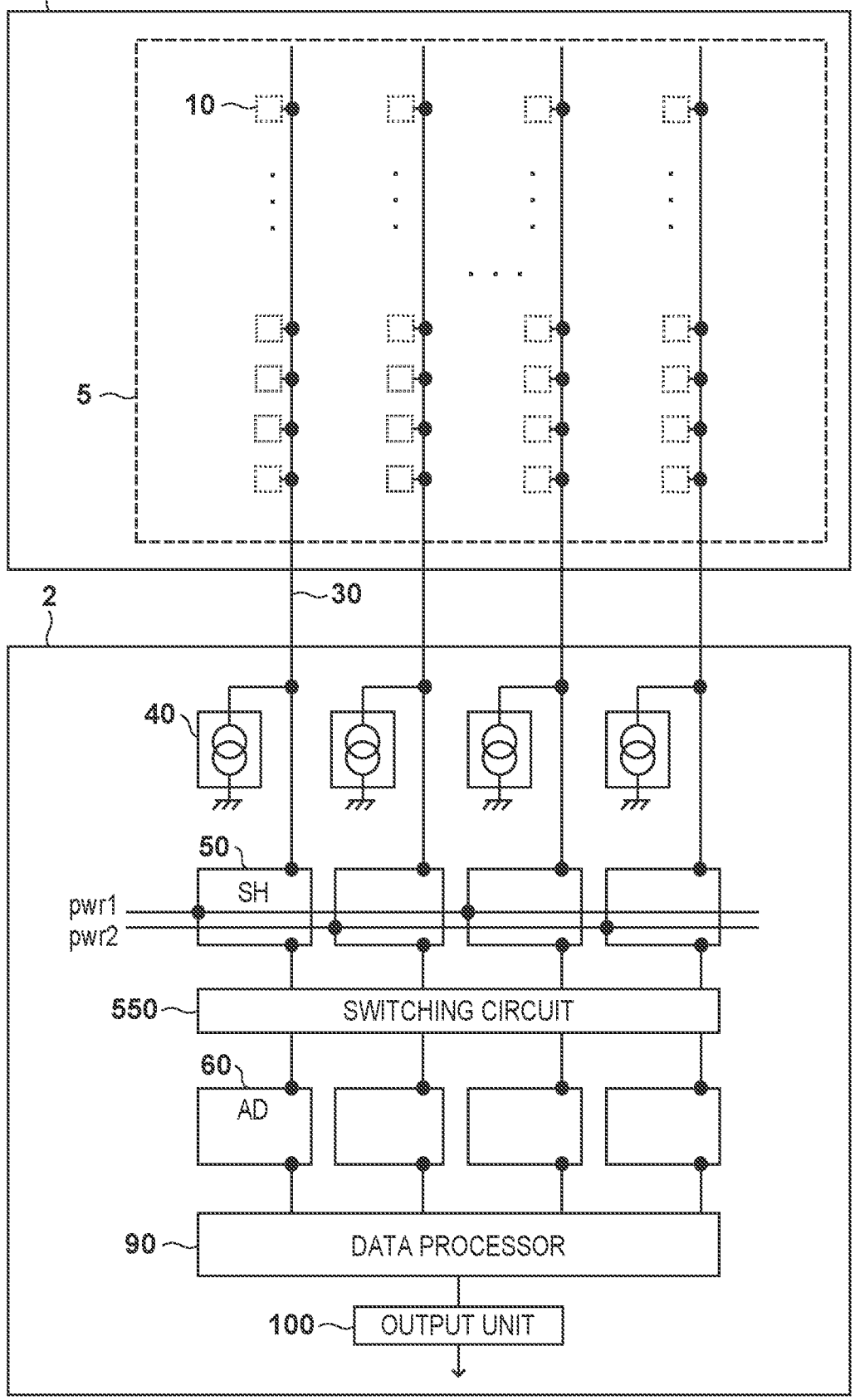
FIG. 10 is a circuit diagram showing the arrangement of a photoelectric conversion device according to the third embodiment.
Figure 11:
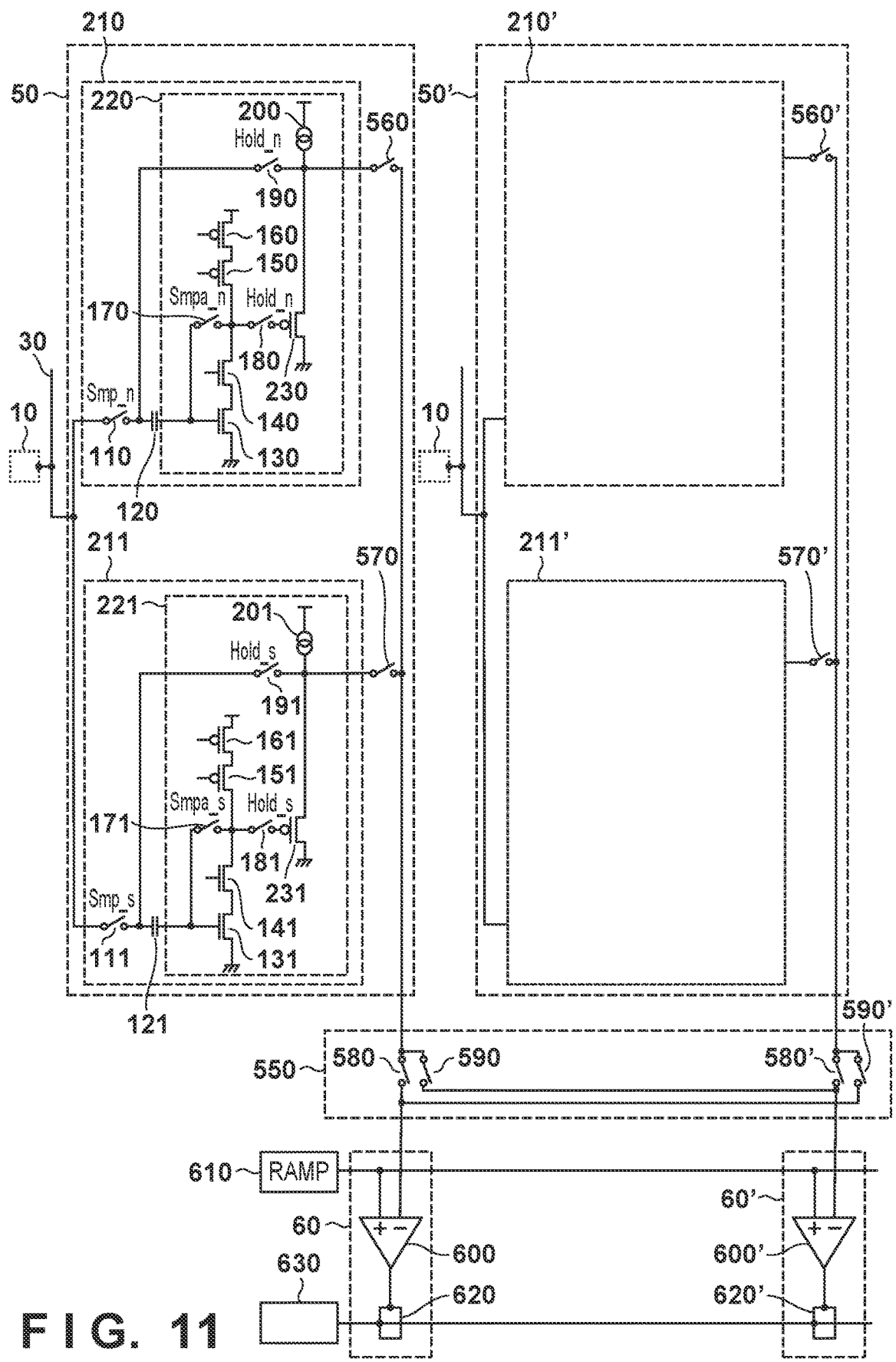
FIG. 11 is a circuit diagram showing an example of the arrangement of sample-and-hold units and AD converters in the photoelectric conversion device according to the third embodiment.

FIG. 10 shows the arrangement of a photoelectric conversion device ISD according to the third embodiment. FIG. 11 shows an example of the arrangement of sample-and-hold units 50 and AD converters 60 in the photoelectric conversion device ISD according to the third embodiment. Matters not mentioned in the third embodiment can comply with the first embodiment. In the third embodiment, a switching circuit 550 is arranged between the plurality of sample-and-hold units 50 and the plurality of AD converters 60. In the second and third modes, the switching circuit 550 can supply an output from the sample-and-hold unit 50 in the normal operation state to the AD converter 60 of the same column as that of the sample-and-hold unit 50 and an AD converter 60' adjacent to the AD converter 60. That is, in the second and third modes, the switching circuit 550 functions as a demultiplexer. In the second and third modes, a data processor 90 can include a circuit that averages outputs from the two AD converters 60 and 60' supplied with the signal from the same sample-and-hold unit 50. This can reduce noise by averaging while reducing the total power consumption of the plurality of sample-and-hold units 50.

The ratio between the number of sample-and-hold units 50 maintained in the first state and the number of sample-and-hold units 50 maintained in the second state need not be 1:1, and may be, for example, 1:2 or 1:3. The switching circuit 550 can be configured to supply, in the second and third modes, the output from the sample-and-hold unit 50 maintained in the normal operation state to the AD converter 60 of the same column as that of the sample-and-hold unit 50 and the AD converter 60' of at least one other column. In other words, the switching circuit 550 can be configured to provide an output from the sample-and-hold unit 50 to at least two AD converters 60.

The switching circuit 550 can include switches 580 and 590 assigned to the sample-and-hold unit 50 of the first reading circuit and switches 580' and 590' assigned to a sample-and-hold unit 50' of the second reading circuit. In the first mode, the switches 580 and 580' can be turned on. In the second mode, the switches 580 and 590 can be turned on. In the third mode, the switches 580' and 590' can be turned on.

Each AD converter 60 may be a delta-sigma AD converter but may be an AD converter of another type. As one example, FIG. 11 shows an example in which each AD converter 60 is formed by a single slope AD converter. Each AD converter 60 can include a comparator 600 and a memory 620. The comparator 600 of each AD converter 60 can be supplied with a ramp signal from a ramp signal generator 610 commonly provided for the plurality of AD converters 60. The comparator 600 of each AD converter 60 can compare a signal (noise level and photo signal level) supplied from the switching circuit 550 with the ramp signal, and output a comparison result. The memory 620 of each AD converter 60 can be supplied with a count value from a counter 630 commonly provided for the plurality of AD converters 60, and can latch the count value every time the comparison result from the comparator 600 is inverted. The comparator 600 may include a switch and a capacitance for an auto zero operation.

In the second mode, for example, the sample-and-hold unit 50' is set in the second state, the switches 580 and 590 are turned on, and the switches 580' and 590' are turned off. Then, each of the AD converters 60 and 60' AD-converts the noise level and the photo signal level time-divisionally supplied from the sample-and-hold unit 50. The data processor 90 can include a circuit that executes CDS processing of calculating the difference between the noise level and the photo signal level output from the AD converter 60 and CDS processing of calculating the difference between the noise level and the photo signal level output from the AD converter 60'. Furthermore, the data processor 90 can include a circuit that averages the result of the CDS processing of the signal from the AD converter 60 and the result of the CDS processing of the signal from the AD converter 60'.

The first embodiment has explained the example in which both the sample-and-hold unit 50 and the AD converter 60 forming the reading circuit RC are controlled by the first or second control signal. Each of the second and third embodiments has explained the example in which out of the sample-and-hold unit 50 and the AD converter 60 forming the reading circuit RC, the sample-and-hold unit 50 is controlled by the first or second control signal. The first control signal can be understood as a signal for controlling at least some of the plurality of first reading circuits RC forming the first group, and second control signal can be understood as a signal for controlling at least some of the plurality of second reading circuits RC forming the second group.

The arrangement of the photoelectric conversion device ISD is not limited to the above examples. For example, the pixel 10 may be configured to change the capacitance of the floating diffusion. If the pixel having such function is adopted, the capacitance of the floating diffusion may be changed for each frame or changed during the reading period of each row. The pixel 10 may have a structure in which a floating diffusion is shared by a plurality of photoelectric converters. Furthermore, the plurality of photoelectric converters may share a microlens. The second and third modes are advantageous in reading a signal of each of two photoelectric converters sharing one microlens with low power consumption and low noise. The second and third modes may be used to detect the outputs, defocus amount, or phase difference of the two photoelectric converters sharing one microlens. If a plurality of vertical signal lines are provided for one pixel column, a plurality of selection transistors may be provided in one pixel.

An example of a photoelectric conversion system using the photoelectric conversion device of each of the above-described embodiments will be described below.

Figure 12:
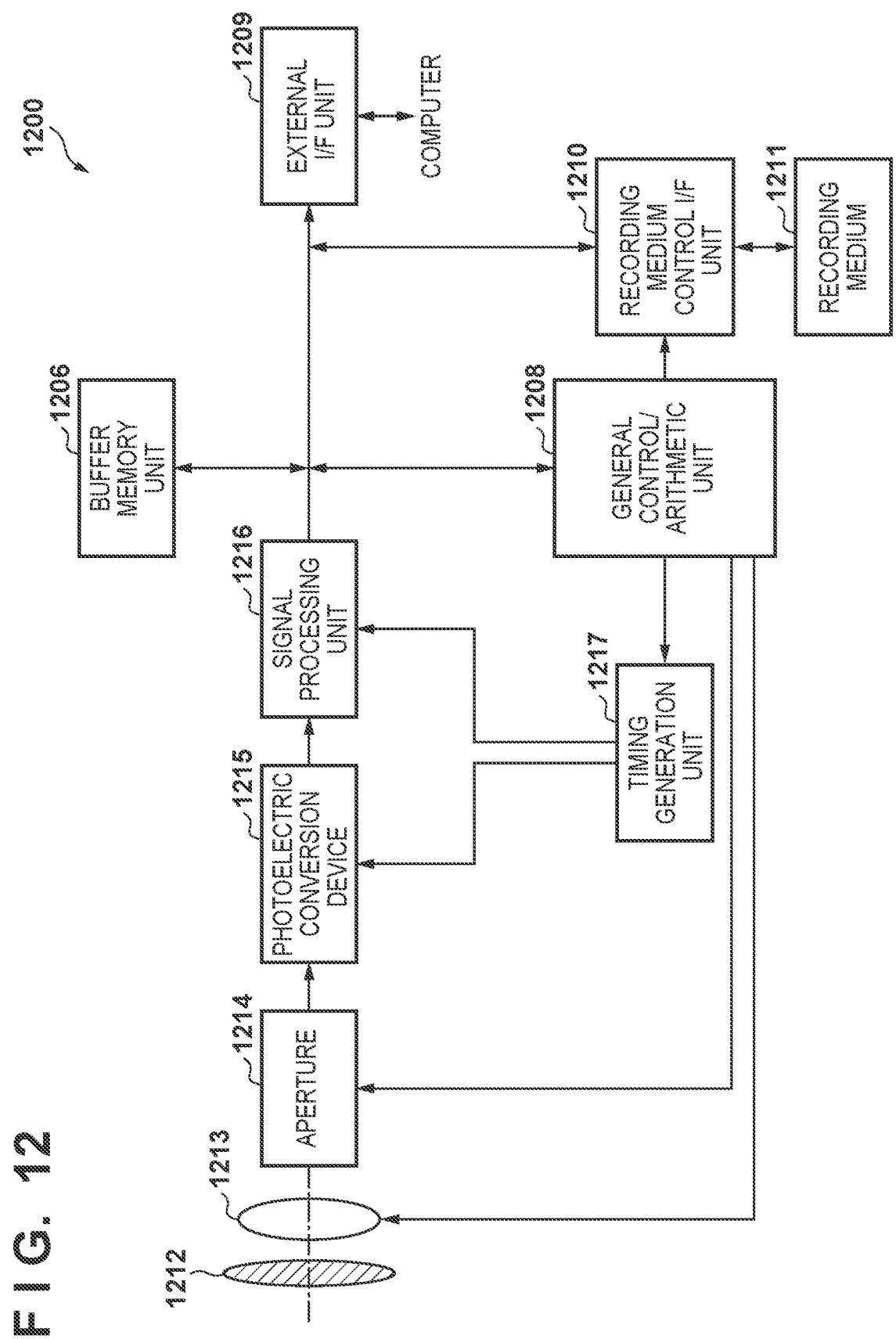
FIG. 12 is a block diagram showing the arrangement of a photoelectric conversion system according to an embodiment.

FIG. 12 is a block diagram showing the arrangement of a photoelectric conversion system 1200 according to this embodiment. The photoelectric conversion system 1200 according to this embodiment includes a photoelectric conversion device 1215. The photoelectric conversion device 1215 is the photoelectric conversion device ISD described in the above embodiments. The photoelectric conversion system 1200 can be used as, for example, an image capturing system. Practical examples of the image capturing system are a digital still camera, a digital camcorder, and a monitoring camera. FIG. 12 shows an example of a digital still camera as the photoelectric conversion system 1200.

The photoelectric conversion system 1200 shown in FIG. 12 includes the photoelectric conversion device 1215, a lens 1213 for forming an optical image of an object on the photoelectric conversion device 1215, an aperture 1214 for changing the amount of light passing through the lens 1213, and a barrier 1212 for protecting the lens 1213. The lens 1213 and the aperture 1214 form an optical system for concentrating light to the photoelectric conversion device 1215.

The photoelectric conversion system 1200 includes a signal processor 1216 for processing an output signal output from the photoelectric conversion device 1215. The signal processor 1216 performs an operation of signal processing of performing various kinds of correction and compression for an input signal, as needed, thereby outputting the resultant signal. The photoelectric conversion system 1200 further includes a buffer memory unit 1206 for temporarily storing image data and an external interface unit (external OF unit) 1209 for communicating with an external computer or the like. Furthermore, the photoelectric conversion system 1200 includes a recording medium 1211 such as a semiconductor memory for recording or reading out image capturing data, and a recording medium control interface unit (recording medium control OF unit) 1210 for performing a recording or reading operation in or from the recording medium 1211. The recording medium 1211 may be incorporated in the photoelectric conversion system 1200 or may be detachable. In addition, communication with the recording medium 1211 from the recording medium control OF unit 1210 or communication from the external OF unit 1209 may be performed wirelessly.

Furthermore, the photoelectric conversion system 1200 includes a general control/arithmetic unit 1208 that controls various kinds of operations and the entire digital still camera, and a timing generation unit 1217 that outputs various kinds of timing signals to the photoelectric conversion device 1215 and the signal processor 1216. In this example, the timing signal and the like may be input from the outside, and the photoelectric conversion system 1200 need only include at least the photoelectric conversion device 1215 and the signal processor 1216 that processes an output signal output from the photoelectric conversion device 1215. As described in the fourth embodiment, the timing generation unit 1217 may be incorporated in the photoelectric conversion device. The general control/arithmetic unit 1208 and the timing generation unit 1217 may be configured to perform some or all of the control functions of the photoelectric conversion device 1215.

The photoelectric conversion device 1215 outputs an image signal to the signal processor 1216. The signal processor 1216 performs predetermined signal processing for the image signal output from the photoelectric conversion device 1215 and outputs image data. The signal processor 1216 also generates an image using the image signal. Furthermore, the signal processor 1216 may perform distance measurement calculation for the signal output from the photoelectric conversion device 1215. Note that the signal processor 1216 and the timing generation unit 1217 may be incorporated in the photoelectric conversion device. That is, each of the signal processor 1216 and the timing generation unit 1217 may be provided on a substrate on which pixels are arranged or may be provided on another substrate. An image capturing system capable of acquiring a higher-quality image can be implemented by forming an image capturing system using the photoelectric conversion device of each of the above-described embodiments.

Figure 13A:
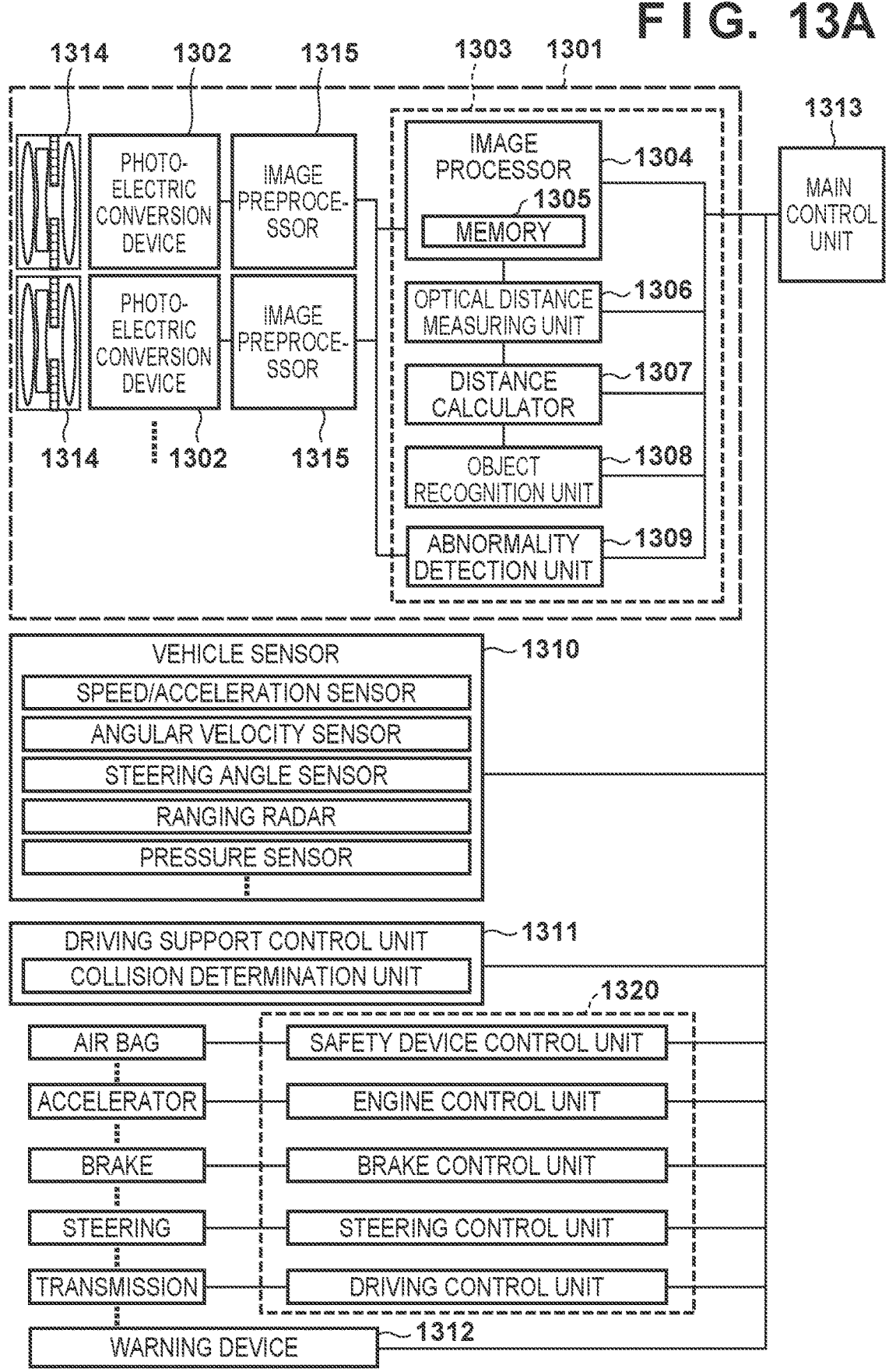
FIGS. 13A and 13B are a block diagram and a view showing the arrangement of a photoelectric conversion system and a moving body according to the embodiment.
Figure 13B:
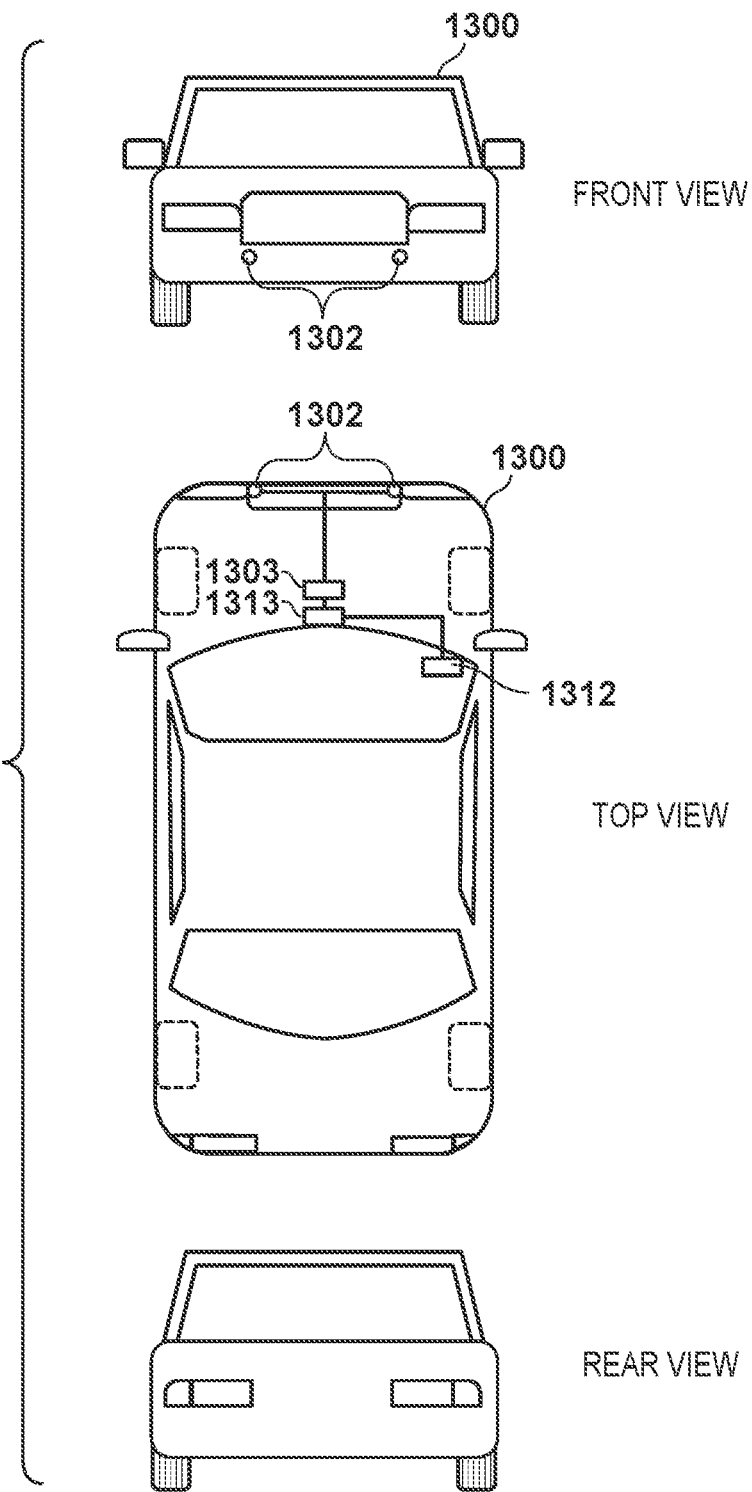

A photoelectric conversion system and a moving body according to this embodiment will be described with reference to FIGS. 13A and 13B. FIGS. 13A and 13B show examples of a vehicle system and a photoelectric conversion system that is incorporated in the vehicle system and performs image capturing. A photoelectric conversion system 1301 includes a photoelectric conversion device 1302, an image preprocessor 1315, an integrated circuit 1303, and an optical system 1314. The optical system 1314 forms an optical image of an object on the photoelectric conversion device 1302. The photoelectric conversion device 1302 converts, into an electrical signal, the optical image of the object formed by the optical system 1314. The photoelectric conversion device 1302 is the above-described photoelectric conversion device ISD. The image preprocessor 1315 performs predetermined signal processing for the signal output from the photoelectric conversion device 1302. The function of the image preprocessor 1315 may be incorporated in the photoelectric conversion device 1302. In the photoelectric conversion system 1301, at least two sets of the optical systems 1314, the photoelectric conversion devices 1302, and the image preprocessors 1315 are arranged, and an output from the image preprocessor 1315 of each set is input to the integrated circuit 1303.

The integrated circuit 1303 is an image capturing system application specific integrated circuit, and includes an image processor 1304 with a memory 1305, an optical distance measurement unit 1306, a distance measurement calculation unit 1307, an object recognition unit 1308, and an abnormality detection unit 1309. The image processor 1304 performs image processing such as development processing and defect correction for the output signal from each image preprocessor 1315. The memory 1305 temporarily stores a captured image, and stores the position of a defect in the captured image. The optical distance measurement unit 1306 performs focusing or distance measurement of an object. The distance measurement calculation unit 1307 calculates distance measurement information from a plurality of image data acquired by the plurality of photoelectric conversion devices 1302. The object recognition unit 1308 recognizes objects such as a vehicle, a road, a road sign, and a person. Upon detecting an abnormality of the photoelectric conversion device 1302, the abnormality detection unit 1309 notifies a main control unit 1313 of the abnormality.

The integrated circuit 1303 may be implemented by dedicated hardware, a software module, or a combination thereof. Alternatively, the integrated circuit may be implemented by an FPGA (Field Programmable Gate Array), an ASIC (Application Specific Integrated Circuit), or a combination thereof.

The main control unit 1313 comprehensively controls the operations of the photoelectric conversion system 1301, vehicle sensors 1310, a control unit 1320, and the like. A method in which the photoelectric conversion system 1301, the vehicle sensors 1310, and the control unit 1320 each individually include a communication interface and transmit/receive control signals via a communication network (for example, CAN standards) may be adopted without providing the main control unit 1313.

The integrated circuit 1303 has a function of transmitting a control signal or a setting value to each photoelectric conversion device 1302 by receiving the control signal from the main control unit 1313 or by its own control unit.

The photoelectric conversion system 1301 is connected to the vehicle sensors 1310 and can detect the traveling state of the self-vehicle such as the vehicle speed, the yaw rate, and the steering angle, the external environment of the self-vehicle, and the states of other vehicles and obstacles. The vehicle sensors 1310 also serve as a distance information acquisition unit that acquires distance information to a target object. Furthermore, the photoelectric conversion system 1301 is connected to a driving support control unit 1311 that performs various driving support operations such as automatic steering, adaptive cruise control, and anti-collision function. More specifically, with respect to a collision determination function, based on the detection results from the photoelectric conversion system 1301 and the vehicle sensors 1310, a collision with another vehicle or an obstacle is estimated or the presence/absence of a collision is determined. This performs control to avoid a collision when the collision is estimated or activates a safety apparatus at the time of a collision.

Furthermore, the photoelectric conversion system 1301 is also connected to an alarm device 1312 that generates an alarm to the driver based on the determination result of a collision determination unit. For example, if the determination result of the collision determination unit indicates that the possibility of a collision is high, the main control unit 1313 performs vehicle control to avoid a collision or reduce damage by braking, releasing the accelerator pedal, or suppressing the engine output. The alarm device 1312 sounds an alarm such as a sound, displays alarm information on the screen of a display unit such as a car navigation system or a meter panel, applies a vibration to the seat belt or a steering wheel, thereby giving an alarm to the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-045158, filed Mar. 18, 2021, which is hereby incorporated by reference herein in its entirety.

What is claimed is:

1. A photoelectric conversion device comprising:
a pixel array including a plurality of pixels arranged to form a plurality of rows and a plurality of columns; and
a reading unit including a plurality of reading circuits each configured to read a signal from the pixel array,
wherein each of the plurality of reading circuits includes a sample-and-hold unit, the sample-and-hold unit including (1) a first sample-and-hold circuit configured to hold a reset level output from the pixel array and (2) a second sample-and-hold circuit configured to hold a photo signal level output from the pixel array,
wherein the plurality of reading circuits include (1) a plurality of first reading circuits forming a first group and (2) a plurality of second reading circuits forming a second group, wherein the first sample and hold circuit and the second sample and hold circuit included in one of the plurality of first reading circuits are controlled by a first control signal given via a first control line, and
wherein the first sample and hold circuit and the second sample and hold circuit included in one of the plurality of second reading circuits are controlled by a second control signal given via a second control line.

2. The device according to claim 1, wherein the photoelectric conversion device has a plurality of operation modes, and
wherein the plurality of operation modes include modes in which an active period of the first control signal and an active period of the second control signal are different from each other.

3. The device according to claim 1, further comprising a generator circuit configured to generate the first control signal and the second control signal.

4. The device according to claim 1, further comprising a first pad and a second pad which are configured to receive the first control signal and the second control signal from the outside, respectively.

5. The device according to claim 1, wherein the first control signal is a signal for setting the plurality of first reading circuits in one of a plurality of states including a first state and a second state,
wherein the second control signal is a signal for setting the plurality of second reading circuits in one of the plurality of states, and
wherein the second state is a state in which power consumption is lower than in the first state.

6. The device according to claim 1, wherein each of the plurality of reading circuits further includes an AD converter configured to AD-convert a signal provided from the sample-and-hold unit.

7. The device according to claim 6, wherein the AD converter includes a delta-sigma AD converter.

8. The device according to claim 7, wherein each of the plurality of first reading circuits includes a potential fixing device configured to fix a potential of an input node of the delta-sigma AD converter in accordance with the first control signal, and
wherein each of the plurality of second reading circuits includes a potential fixing device configured to fix a potential of an input node of the delta-sigma AD converter in accordance with the second control signal.

9. The device according to claim 6, wherein the reading unit includes a switching circuit configured to supply an output from each sample-and-hold unit to at least two AD converters.

10. The device according to claim 1, wherein the reading unit is configured to generate a signal corresponding to a signal of a pixel assigned with one of the plurality of first reading circuits and a signal of a pixel assigned with one of the plurality of second reading circuits.

11. The device according to claim 1, wherein the reading unit further includes:
a first switch configured to electrically connect an output of the first sample-and-hold circuit of one of the plurality of first reading circuits and an output of the first sample-and-hold circuit of one of the plurality of second reading circuits; and
a second switch configured to electrically connect an output of the second sample-and-hold circuit of one of the plurality of first reading circuits and an output of the second sample-and-hold circuit of one of the plurality of second reading circuits.

12. The device according to claim 11, wherein the sample-and-hold unit includes a resistive element configured to connect the output of the first sample-and-hold circuit and the output of the second sample-and-hold circuit.

13. The device according to claim 1, wherein the reading unit includes a circuit configured to average an output from one of the plurality of first reading circuits and an output from one of the plurality of second reading circuits.

14. The device according to claim 1, wherein the first sample-and-hold circuit includes a first capacitive element and a first amplifier, and
wherein the second sample-and-hold circuit includes a second capacitive element and a second amplifier.

15. A photoelectric conversion system comprising:
a photoelectric conversion device according to claim 1; and
a signal processor configured to process a signal output from the photoelectric conversion device.

16. A moving body comprising:
a photoelectric conversion device according to claim 1; and a signal processor configured to process a signal output from the photoelectric conversion device.

17. A substrate comprising:
a reading unit including a plurality of reading circuits each configured to read a signal from a pixel array including a plurality of pixels,
wherein each of the plurality of reading circuits includes a sample-and-hold unit, the sample-and-hold unit including (1) a first sample-and-hold circuit configured to hold a reset level output from the pixel array and (2) a second sample-and-hold circuit configured to hold a photo signal level output from the pixel array,
wherein the plurality of reading circuits include (1) a plurality of first reading circuits forming a first group and (2) a plurality of second reading circuits forming a second group,
wherein the first sample and hold circuit and the second sample and hold circuit included in one of the plurality of first reading circuits, are controlled by a first control signal given via a first control line and wherein the first sample and hold circuit and the second sample and hold circuit included in one of the plurality of second reading circuits are controlled by a second control signal given via a second control line.

18. The device according to claim 1, wherein the one of the plurality of first reading circuits and the one of the plurality of second reading circuits are arranged to be adjacent to each other.

19. The device according to claim 1, wherein the first control line and the second control line pass through the plurality of reading circuits.

20. The device according to claim 1, wherein a number of the plurality of first reading circuits controlled by the first control signal given via the first control line and a number of the plurality of second reading circuits controlled by the second control signal given via the second control line are the same.

* * * * *